2,746,929

PROCESS FOR MAKING DETERGENT COMPOSITIONS

Louis E. Wells, Jr., and Henry V. Moss, Anniston, Ala., assignors to Monsanto Chemical Company, St. Louis, Mo., a corporation of Delaware No Drawing. Application May 12, 1949,
Serial No. 92,953

11 Claims. (Cl. 252—135)

This invention provides a detergent and a process for producing the same.

An object of this invention is to provide a detergent having improved physical properties and retentivity of its components. Another object is to provide a non-separable detergent composition comprising an active ingredient which is an oily liquid or semi-liquid material and a crystalline salt builder ingredient. A further object is to provide a process whereby the builder ingredient is formed in the presence of the active ingredient. A still further object is to provide a detergent composition containing an active ingredient which is a condensation product of a primary, secondary or tertiary mercaptan with ethylene oxide.

Condensation products within the scope of the instant invention are those products which are readily dispersible or soluble in water obtained by reacting from 5 to 40 moles of an alkylene oxide such as ethylene oxide, propylene oxide, butylene oxide and equivalent materials with organic compounds containing at least one SH-group in the presence or absence of catalysts. As initial materials may be mentioned aliphatic, cyclo-aliphatic, aromatic or mixed aliphatic aromatic compounds containing one or more SH groups which contain at least 6 carbon atoms in the molecule and also mercaptans which are substituted by halogen atoms, or nitro, sulphonic, carbonyl, ether or ester groups. For example, hexyl, heptyl, octyl, dodecyl, cetyl, octadecyl and oleyl mercaptans, 7.18 octadecane dimercaptan, cyclohexyl mercaptan, methyl cyclohexyl mercaptan, thiophenols, thionaphthols, thiosalicylic acid, para-nitro-thiophenol and benzyl mercaptan are suitable.

While all of the above mercaptans are useful in the production of the detergent compositions of the instant invention, the condensation products of tertiary mercaptans with ethylene oxide are preferred. These products are described in and may be prepared by the method described in pending application Serial No. 718,133, filed December 23, 1946, now abandoned, which application is assigned to the same assignee as the present invention. According to the process described in said application, condensation products are prepared by passing ethylene oxide in the gas or liquid form into a tertiary mercaptan having at least 8 carbon atoms and up to and including 18 carbon atoms in the molecule, which mercaptans are derived from a polymerized olefin. The tertiary mercaptan derived from a polymerized olefin may be prepared as described in U. S. Patent No. 2,378,030 or U. S. Patent No. 2,392,555. The condensation products of the tertiary mercaptans with ethylene oxide may be prepared in a manner similar to that described in U. S. Patent No. 2,205,021, describing the condensation of primary mercaptans usually with the aid of an alkaline catalyst.

According to the process described in said pending application Serial No. 718,133, products containing from 5 moles of condensed ethylene oxide and up to 40 moles of condensed ethylene oxide per mole of mercaptan may be prepared. These products are oily liquid to semi-liquid materials.

In order to prepare detergent compositions including the oily ethylene oxide condensation products as active ingredients, it has been proposed to combine these materials with solid, finely divided alkali metal phosphate salts or mixtures of such phosphates with sodium carbonate or sodium sesquicarbonate and in some cases including starch in the composition. In order to increase the adsorptive power of the solid, finely divided salt ingredient for the oily condensation product ingredient, it has been recommended in British Patent No. 469,334 to employ various calcined salts in place of the crystalline hydrated salts. This recommendation is based principally upon the observation that the use of calcined salts which are produced by the calcination of a metal salt of a mineral acid, with escape of a gaseous phase, resulted in the formation of hollow spaces within the particles. Such porous calcination products were accordingly recommended as adsorbent materials for the liquid or semi-liquid condensation products with the object of more completely adsorbing the oily condensation product and hence preventing it from striking through the paper package in which it was contained or sold.

We have now found that a more effective adsorbent material for the oily liquid or semi-liquid ethylene oxide condensation products is obtained by conducting a hydration reaction of a hydratable salt in the presence of the said condensation products. A suitable hydration reaction reaction may involve the hydration of an originally anhydrous or partly hydrated salt or it may involve first a chemical reaction whereby an anhydrous or partly hydrated salt is formed which is then followed by a further hydration whereby a more completely hydrated salt is formed. Contrary to what would have been expected, the hydrated salt products so formed retain the oily liquid or semi-liquid ethylene oxide condensation products more effectively than those produced from calcined salts. At the same time, the products so produced are much more pulverulent and free-flowing, even after having been subjected to considerable pressure, especially during storage under freezing conditions.

The tenacity with which the salts can be made to retain the oily ethylene oxide condensation products may be measured by a "soaking test" which is carried out by placing a pile of the product on a piece of adsorbent paper, such for example as filter paper, placing a weight upon the pile and then allowing the pile to remain weighted in this position for several days. At the end of this time the paper is removed, solvent extracted, the solvent removed and the residue weighed. The amount of the residue so recovered is a measure of the tenacity with which the salt retains the oily condensation product. As will be obvious, products from which a large quantity of condensation product is transmitted to the paper have a lower retentivity than those from which small amounts of product are transmitted.

By applying the above soaking test to a series of products produced by various methods, it has been observed that the product produced by conducting the hydration reaction of an anhydrous salt or the more complete hydration of a partly hydrated salt in the presence of the oily condensation product shows a markedly improved retentivity for the oily condensation products. The improved product at the same time exhibits a better color and a greater flowability than do the prior known products.

The following examples illustrate our invention:

Example 1

Anhydrous tetrasodium pyrophosphate, 100 parts by weight, is mixed with 40 parts by weight of the oily condensation product obtained by reacting 100 parts or tertiary dodecyl mercaptan with 228 parts of ethylene oxide. The mixing may be carried out manually or preferably in a mechanical mixer. To the product so produced water is added gradually and with continued mixing. The amount of water added is not more than sufficient to hydrate the tetrasodium pyrophosphate to the decahydrate. The product so produced shows excellent retentivity of the oily ethylene oxide condensation product and a high rate of flow. The final product contains approximately 20% of the condensation product and 80% of tetrasodium pyrophosphate decahydrate.

Example 2

85 parts by weight of the oily condensation product obtained by reacting 100 parts of tertiary dodecyl mercaptan with 178 parts of ethylene oxide is mixed with 15 parts of water and then 100 parts of the above solution is added to and mixed with 203 parts of finely divided calcined anhydrous tetrasodium pyrophosphate. Mixing is carried out with the aid of a mechanical stirrer. After the water contained in the oily condensation product has reacted with the anhydrous salt, a further 122 parts of water are added to the mixture in order to hydrate the tetrasodium pyrophosphate to the decahydrate. The product is somewhat better in retentivity of the oily condensation product than that produced according to Example 1.

Example 3

24.3 parts of water is added to 20 parts of the oily condensation product of tertiary dodecyl mercaptan with 14 moles of condensed ethylene oxide.

33.4 parts of sodium acid pyrophosphate, anhydrous, is placed in a mechanical mixer and the water solution of the tertiary dodecyl mercaptan as prepared above is added thereto with stirring. After the mixture has become uniform, 16 parts of sodium carbonate is slowly added. During reaction the liberation of $CO_2$ gas occurs. The mixture as a result develops considerable foam. After foaming has subsided, an additional 13 parts of sodium carbonate is added, stirring being continued. The mixture is quite wet until the last portion of sodium carbonate has been added, when it becomes dry and granular.

The mixture thus produced contains the equivalent of the following composition.

| | Parts |
|---|---|
| Mercaptan-ethylene oxide condensation product | 20 |
| Tetrasodium pyrophosphate decahydrate | 67 |
| Sodium carbonate | 13 |

The above composition is produced if the reaction between sodium acid pyrophosphate and sodium carbonate is complete but this is not believed to be the case. The reactions are believed to involve one or more of the following:

(1) $Na_2H_2P_2O_7 + Na_2CO_3 \rightarrow Na_4P_2O_7 + CO_2 + H_2O$ (2) $2Na_2H_2P_2O_7 + Na_2CO_3 \rightarrow Na_3HP_2O_7 + CO_2 + H_2O$ (3) $Na_2H_2P_2O_7 + Na_2CO_3 \rightarrow Na_3HP_2O_7 + NaHCO_3$ Thus, in the above composition the 67 parts of tetrasodium pyrophosphate decahydrate actually may represent an equivalent amount of a mixture of this material and hydrated trisodium hydrogen pyrophosphate and the 13 parts of sodium carbonate may represent an equivalent mixture of sodium carbonate and sodium bicaronate.

In hydrating the pyrophosphate salt, it is assumed that all of the sodium acid pyrophosphate has been converted to tetrasodium pyrophosphate. However, satisfactory results are obtainable if it is assumed that only reactions (1) and (2) take place and enough water is added to completely or substantially completely yield the nonohydrate of trisodium hydrogen pyrophosphate:

$$Na_3HP_2O_7 \cdot 9H_2O$$

If desired, hydration of the pyrophosphate salt may also be carried out by adding aqueous solutions of salts such, for example, as sodium silicates. For this purpose, the liquid commercial form of sodium silicates which contain from 46% to 63% of water, 9% to 18% of $Na_2O$ and 29% to 36% $SiO_2$ may be used.

Example 4

15 parts of the oily condensation product of tertiary tetradecyl mercaptan with 15 moles of ethylene oxide per mole of mercaptan is added to 62 parts of finely divided anhydrous sodium tripolyphosphate, $Na_5P_3O_{10}$, and thoroughly mixed in a mechanical mixer. Liquid "N" brand silicate, 23 parts, is added and the mixing continued for approximately 10 minutes or more. The mixed product is removed from the mixer and is a cream colored powder slightly granular and of good retentivity. This example illustrates the hydration of sodium tripolyphosphate by means of the water contained in the aqueous silicate.

While the use of aqueous sodium silicates is not ordinarily looked upon with favor by reason of the formation of sticky or gummy lumps in the product, we have found that when the addition of the aqueous silicate is made to the anhydrous or partly hydrated tetrasodium pyrophosphate in the presence of the ethylene oxide condensation product the material quickly becomes dry and free-flowing.

Alkali metal salts capable of further hydration in the present reaction are, for example, the following sodium salts, the list herewith showing the anhydrous salt, the intermediate hydrates, if any, and the fully hydrated form of the salt.

Sodium carbonate:
$Na_2CO_3$, $Na_2CO_3 \cdot H_2O$, $Na_2CO_3 \cdot 7H_2O$ and
$$Na_2CO_3 \cdot 10H_2O$$

Sodium sulfate:
$Na_2SO_4$, $Na_2SO_4 \cdot H_2O$ and $Na_2SO_4 \cdot 7H_2O$.

Sodium tripolyphosphate:
$Na_5P_3O_{10}$, $Na_5P_3O_{10} \cdot 6H_2O$.

Sodium sesquicarbonate:
$Na_3H(CO_3)_2$, $Na_3H(CO_3)_2 \cdot 2H_2O$ or mixtures or normal and acid sodium carbonates variously known as modified sodas ranging in proportions of constituents from $2NaHCO_3:Na_2CO_3$ to $NaHCO_3$ to $2Na_2CO_3$.

Disodium orthophosphate:
$Na_2HPO_4$, $Na_2HPO_4 \cdot 7H_2O$, $Na_2HPO_4 \cdot 12H_2O$.

Trisodium orthophosphate:
$Na_3PO_4$, $Na_3PO_4 \cdot 12H_2O$.

By the term "capable of further hydration" as used in the specification and claims, we mean either the anhydrous form of the salt or the lower hydrate of the salt which, on reaction with water forms a higher hydrate or the completely hydrated form of the salt. Obviously, the hydrate so produced should be stable at ordinary temperatures. At least one part by weight of a salt capable of further hydration should be hydrated in the presence of from 0.1 to 1 part of the oily condensation product, it being understood that the relative proportion of salt to condensation product will vary with the condensation product used.

Carboxy methyl cellulose is desirably added to the composition in the amount of from 0.5% to 5.0% in the final product. The product produced according to the above procedure is adjusted to the following composition:

| | Per cent |
|---|---|
| Ethylene oxide condensation product | 20 |
| Tetrasodium pyrophosphate decahydrate | 67 |
| Sodium silicate, Na$_2$O:SiO$_2$ ratio 1:3.2 | 9 |
| Carboxy methyl cellulose | 1.5 |
| Soda ash | 2.5 |

It is obvious that various other compositions can be made by the incorporation of additional salts which may be hydrated or not, as desired.

Compounds which are reactive with sodium acid pyrophosphate and which in the presence of water form trisodium hydrogen pyrophosphate or tetrasodium pyrophosphate are the alkali metal carbonates, bicarbonates or the sesquicarbonate. By reason of the availability of the sodium salts we prefer to employ sodium carbonate, sodium bicarbonate or sodium sesquicarbonate. The amount employed should be at least sufficient to convert the sodium acid pyrophosphate to trisodium hydrogen pyrophosphate and preferably to tetrasodium pyrophosphate. For most purposes we prefer to use an excess of the sodium carbonates, since any unreacted carbonate may advantageously remain in the final product.

Illustrative of the results obtained by the present process, we herewith give the results of the above-mentioned soaking test as applied to the preferred detergent formulation produced by the method of the present invention, and also by the method wherein calcined, porous materials are employed as adsorbents.

Example 5

A detergent composition containing the following ingredients was prepared:

| | Parts |
|---|---|
| Tertiary dodecyl mercapatan-ethylene oxide condensation product | 20 |
| Tetrasodium pyrophosphate prepared by heating disodium orthophosphate | 40 |
| Soda ash, prepared by heating sodium bicarbonate | 40 |

The above composition was subjected to the above-mentioned soaking test under the same conditions and at the same time as that prepared by the directions of Example 3 above. The results follow:

| Formulation | Grams Cond. Prod. Absorbed by Filter Paper | Percent of Total Cond. Prod. Absorbed by Filter Paper |
|---|---|---|
| Example 3 | 0.038 | 0.095 |
| Example 5 | 0.528 | 1.32 |

From the above data it will be noted that the retentivity of the tertiary mercaptan-ethylene oxide condensation product has been very greatly increased by carrying out the hydration of the salts in the presence of the condensation product.

What we claim is:

1. The process of increasing the retentivity of a finely-divided inorganic hydratable alkali metal detergent builder for an oily detergent derived from the condensation of an alkylene oxide with a mercaptan containing at least 6 carbon atoms, which consists essentially in gradually adding an aqueous medium to said detergent builder while intimately mixing the latter in the finely divided solid state with said oily detergent in an amount varying from about 0.1 part to about 1 part of said oily detergent for each part of said builder, said aqueous medium supplying water only in an amount sufficient to form a hydrate of said hydratable alkali metal detergent builder and said water incorporated with said aqueous medium being retained in said mixture as a hydrate of said builder.

2. The process of increasing the retentivity of a finely-divided inorganic hydratable alkali metal detergent builder for an oily detergent derived from the condensation of an alkylene oxide with a tertiary mercaptan containing at least 8 carbon atoms, which consists essentially in gradually adding an aqueous medium to said detergent builder while intimately mixing the latter in the finely divided solid state with said oily detergent in an amount varying from 0.1 part to 1 part of said oily detergent for each part of said builder, said aqueous medium supplying water only in an amount sufficient to form a hydrate of said hydratable alkali metal detergent builder and said water incorporated with said aqueous medium being retained in said mixture as a hydrate of said builder.

3. The process of increasing the retentivity of a finely divided inorganic hydratable alkali metal detergent builder for an oily detergent derived from the condensation of ethylene oxide with an aliphatic mercaptan containing at least 6 carbon atoms, which consists essentially in gradually adding an aqueous medium to said detergent builder while intimately mixing the latter in the finely divided solid state with said oily detergent in an amount varying from 0.1 part to 1 part of said oily detergent for each part of said builder, said aqueous medium supplying water only in an amount sufficient to form a hydrate of said hydratable alkali metal detergent builder and said water incorporated with said aqueous medium being retained in said mixture as a hydrate of said builder.

4. The process of increasing the retentivity of a finely divided inorganic hydratable alkali metal detergent builder for an oily detergent derived from the condensation of ethylene oxide with tertiary dodecyl mercaptan, which consists essentially in gradually adding an aqueous medium to said detergent builder while intimately mixing the latter in the finely divided solid state with said oily detergent in an amount varying from 0.1 part to 1 part of said oily detergent for each part of said builder, said aqueous medium supplying water only in an amount sufficient to form a hydrate of said hydratable alkali metal detergent builder and said water incorporated with said aqueous medium being retained in said mixture as a hydrate of said builder.

5. The process defined in claim 4 wherein finely divided solid tetrasodium pyrophosphate is the hydratable alkali metal detergent builder employed.

6. The process defined in claim 4 wherein finely divided solid trisodium hydrogen pyrophosphate is the hydratable alkali metal detergent builder employed.

7. The process defined in claim 4 wherein finely divided solid sodium tripolyphosphate is the hydratable alkali metal detergent builder employed.

8. The process defined in claim 4 wherein the aqueous medium consists of water.

9. The process defined in claim 4 wherein the aqueous medium is a liquid sodium silicate containing 46% to 63% water, 9% to 18% Na$_2$O and 29% to 36% SiO$_2$.

10. The process of increasing the retentivity of finely divided sodium tripolyphosphate for the oily detergent derived from the condensation of ethylene oxide with tertiary tetradecyl mercaptan, which consists essentially in gradually adding an aqueous medium to said salt while intimately mixing about 62 parts of the latter in the finely divided solid state with about 15 parts of said oily detergent, said aqueous medium consisting of a liquid sodium silicate containing 46% to 63% water, 9% to 18% Na$_2$O and 29% to 36% SiO$_2$ and being employed only in an amount sufficient to form a hydrate of said sodium tripolyphosphate and said water incorporated with said aqueous medium being retained in said mixture as a hydrate of said sodium tripolyphosphate.

11. The process of increasing the retentivity of a finely divided inorganic hydratable alkali metal detergent builder for an oily detergent derived from the condensation of ethylene oxide with a mercaptan containing at least 6 carbon atoms, which consists essentially in gradually adding water to said detergent builder while intimately mixing the latter in the finely divided solid state with said oily detergent in an amount varying from about 0.2 part to about 0.5 part of said oily detergent for each part of said builder, said water being added only in an amount sufficient to form a hydrate of said hydratable alkali metal detergent builder and said water being retained in said mixture as a hydrate of said builder.

References Cited in the file of this patent

UNITED STATES PATENTS

| | | |
|---|---|---|
| 2,129,709 | Schuette | Sept. 13, 1938 |
| 2,154,977 | Furness | Apr. 18, 1939 |
| 2,351,559 | Treffler | June 13, 1944 |
| 2,365,215 | Rhodes | Dec. 19, 1944 |
| 2,427,642 | Aitchison | Sept. 16, 1947 |

FOREIGN PATENTS

| | | |
|---|---|---|
| 469,334 | Great Britain | July 23, 1937 |
| 490,285 | Great Britain | Aug. 11, 1938 |